United States Patent
Fellahi et al.

(10) Patent No.: US 10,597,522 B2
(45) Date of Patent: Mar. 24, 2020

(54) POLYPROPYLENE COMPOSITIONS

(71) Applicant: SABIC GLOBAL TECHNOLOGIES B.V., Bergen op Zoom (NL)

(72) Inventors: Said Fellahi, Riyadh (SA); Azzedine Kioul, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 457 days.

(21) Appl. No.: 15/528,146

(22) PCT Filed: Nov. 10, 2015

(86) PCT No.: PCT/EP2015/076246
§ 371 (c)(1),
(2) Date: May 19, 2017

(87) PCT Pub. No.: WO2016/078974
PCT Pub. Date: May 26, 2016

(65) Prior Publication Data
US 2018/0334558 A1  Nov. 22, 2018

(30) Foreign Application Priority Data
Nov. 20, 2014 (EP) .................................... 14194004

(51) Int. Cl.
*C08L 23/12* (2006.01)
*C08L 23/10* (2006.01)
*C08L 59/02* (2006.01)
*C08L 77/02* (2006.01)
*C08K 7/14* (2006.01)
*B29C 45/00* (2006.01)
*B29K 23/00* (2006.01)
*B29K 105/00* (2006.01)

(52) U.S. Cl.
CPC .......... *C08L 23/12* (2013.01); *B29C 45/0001* (2013.01); *C08K 7/14* (2013.01); *C08L 23/10* (2013.01); *C08L 59/02* (2013.01); *C08L 77/02* (2013.01); *B29K 2023/12* (2013.01); *B29K 2105/0094* (2013.01); *C08L 2201/10* (2013.01)

(58) Field of Classification Search
CPC .. C08L 23/12; B29K 2023/12; B29C 45/0001
USPC ....................................................... 524/500
See application file for complete search history.

(56) References Cited

U.S. PATENT DOCUMENTS

| | | | |
|---|---|---|---|
| 3,367,926 A * | 2/1968 | Voeks | C08K 5/0091 524/84 |
| 4,463,113 A | 7/1984 | Nakahara et al. | |
| 5,049,605 A | 9/1991 | Rekers | |
| 5,342,868 A | 8/1994 | Kimura et al. | |
| 6,465,551 B1 | 10/2002 | Zhao et al. | |
| 6,534,574 B1 | 3/2003 | Zhao et al. | |
| 2006/0270766 A1 * | 11/2006 | Xu | C08K 5/1575 524/109 |

FOREIGN PATENT DOCUMENTS

| | | | |
|---|---|---|---|
| BE | 773226 | * | 3/1972 |
| EP | 0940431 A1 | | 9/1999 |
| WO | 2004072168 A2 | | 8/2004 |
| WO | 2005063870 A1 | | 7/2005 |

OTHER PUBLICATIONS

Abstract of BE 773226, Mar. 29, 1972. (Year: 1972).*
International Search Report for International Application No. PCT/EP2015/076246; International Filing Date: Nov. 10, 2015; dated Feb. 1, 2016; 3 Pages.
Li et al., "In-Situ Composite Based on Polypropylene and Nylon 6," Advances in Polymer Technology, Wiley and Sons, Hoboken, NJ, US, vol. 16, No. 4, Dec. 21, 1997, pp. 331-336, ISSN: 0730-6679.
Pang Y. X. et al., "Effects of a compatibilizing agent on the morphology, interface and mechanical behavior of polypropylene/poly(ethylene terephthalate) blends)," Polymer, Elsevier Science Publishers B.V., GB, vol. 41, No. 1, Jan. 1, 2000, pp. 357-365.
Written Opinion of the International Searching Authority for International Application No. PCT/EP2015/076246; International Filing Date: Nov. 10, 2015; dated Feb. 1, 2016; 5 Pages.
Zimm et al., "The Dimensions of Chain Molecules Containing Branches and Rings," The Journal of Chemical Physics, vol. 17, No. 12 (Dec. 1949) pp. 1301-1314.
"300 Questions on Plastic Injection Molding", Zhang Yulong et al., pp. 112-113, China Textile & Apparel Press, 1st Edition, 1st Print, May, 2008.
"Effect of Polymer Nucleating Agent (Polyformaldehyde-based) on Morphology and Mechanical Properties of Polypropylene", Chen Guorong et al., pp. 48-52, vol. 1, No. 4, 1987.
"Polymer Material", Wang Lan et al., pp. 47-48, China Light Industry Press, 1st Edition, 1st Print, Jan. 2009.

* cited by examiner

*Primary Examiner* — Hui H Chin
(74) *Attorney, Agent, or Firm* — Cantor Colburn LLP

(57) ABSTRACT

The invention relates to a composition comprising (a) polypropylene having a melt mass flow rate as measured in accordance with ISO 1133 using a 2.16 kg weight and at a temperature of 230° C. in the range from 10 to 40 g/10 min and (b) a polymer preferably chosen from the group consisting of polyoxymethylene, polyamide and mixture thereof, wherein the amount of component (b) is from 0.005 to 5 wt % based on the total weight of the components (a) and (b) and wherein the polypropylene has a melt temperature TmPP and a crystallization temperature TcPP, the polymer has a melt temperature TmP and a crystallization temperature TcP, wherein the TcP is 5-40° C. higher than TcPP, wherein the $T_m$ and $T_c$ are determined using Differential Scanning Calorimetry according to ASTM D 3418-08 using a scan rate of 10° C./min on a sample of 10 mg and using the second heating cycle.

17 Claims, No Drawings

POLYPROPYLENE COMPOSITIONS

CROSS REFERENCE TO RELATED APPLICATIONS

This application is a 371 of International Application No. PCT/EP2015/076246, filed Nov. 10, 2015, which claims priority to European Application No. 14194004.9, filed Nov. 20, 2014 which are incorporated herein by reference in their entirety.

The invention relates to a composition comprising polypropylene and a polymer having a higher crystallization temperature than polypropylene such as polyoxymethylene (POM) and/or polyamide (PA). The invention also relates to the use of said composition in (thin wall) injection molding and to a process using said composition.

A commercially attractive way of producing injection molded articles is thin wall injection molding (TWIM). In thin wall injection molding, articles can be produced at high speed, since the cycle times can be shorter due to fast cooling of the thin walls. Furthermore, thin wall injection molding reduces the carbon footprint and with that a more sustainable way of producing molded articles is achieved, since less material needs to be injection molded and less energy is needed for the injection molding process.

The materials used for injection molding preferably have good optical properties (transparency, haze and/or clarity).

To this end, nucleating and/or clarifying agents are added to thermoplastic polymers to enable crystals to grow on the nucleating sites provided by the nucleating and/or clarifying agents.

For example, US2006270766 discloses the use of nucleating agents in polypropylene compositions.

In particular, US2006270766 discloses polyolefin composition comprising: (a) a polypropylene resin, said polypropylene resin having an MFR value of at least about 20 as measured by ASTM 1238-04; (b) a first compound comprising bis(3,4-dimethylbenzylidene)sorbitol; and (c) a second compound comprising dibenzylidene sorbitol. The first compound and the second compound acting as nucleating agents led to a good clarity in the article made from the composition.

It is an object of the invention to provide a composition based on polypropylene that is suitable for injection molding, and in particular for thin wall injection molding which has a good clarity.

This object is achieved by a composition comprising
(a) polypropylene having a melt mass flow rate as measured in accordance with ISO 1133 using a 2.16 kg weight and at a temperature of 230° C. in the range from 0.1 to 100 g/10 min and
(b) polyoxymethylene and/or polyamide,
wherein the amount of component (b) is from 0.005 to 10 wt % based on the total weight of the components (a) and (b) and
wherein
the polypropylene has a melt temperature TmPP and a crystallization temperature TcPP,
the polyoxymethylene has a melt temperature TmPOM and a crystallization temperature TcPOM,
the polyamide has a melt temperature TmPA and a crystallization temperature TcPA, wherein TmPOM is higher than TmPP, TmPA is higher than TmPP, TcPOM is higher than TcPP and TcPA is higher than TcPP,
wherein the $T_m$ and $T_c$ are determined using Differential Scanning Calorimetry according to ASTM D 3418-08 using a scan rate of 10° C./min on a sample of 10 mg and using the second heating cycle.

This object is also achieved by a composition comprising
(a) polypropylene having a melt mass flow rate as measured in accordance with ISO 1133 using a 2.16 kg weight and at a temperature of 230° C. in the range from 10 to 40 g/10 min and
(b) a polymer preferably chosen from the group consisting of polyoxymethylene, polyamide and mixture thereof,
wherein the amount of component (b) is from 0.005 to 5 wt % based on the total weight of the components (a) and (b) and
wherein
the polypropylene (a) has a melt temperature TmPP and a crystallization temperature TcPP,
the polymer (b) has a melt temperature TmP and a crystallization temperature TcP,
wherein the TcP is 5-40° C. higher than TcPP,
wherein the $T_m$ (melt temperature) and $T_c$ (crystallization temperature) are determined using Differential Scanning Calorimetry according to ASTM D 3418-08 using a scan rate of 10° C./min on a sample of 10 mg and using the second heating cycle.

Preferably, the invention relates to a composition comprising
(a) polypropylene having a melt mass flow rate as measured in accordance with ISO 1133 using a 2.16 kg weight and at a temperature of 230° C. in the range from 10 to 40 g/10 min and
(b) polyoxymethylene and/or polyamide,
wherein the amount of component (b) is from 0.005 to 5 wt % based on the total weight of the components (a) and (b) and
wherein
the polypropylene has a melt temperature TmPP and a crystallization temperature TcPP,
the polyoxymethylene has a melt temperature TmPOM and a crystallization temperature TcPOM,
the polyamide has a melt temperature TmPA and a crystallization temperature TcPA, wherein TmPOM is higher than TmPP, TmPA is higher than TmPP, TcPOM is 5-40° C. higher than TcPP and TcPA is 5-40° C. higher than TcPP,
wherein the $T_m$ and $T_c$ are determined using Differential Scanning Calorimetry according to ASTM D 3418-08 using a scan rate of 10° C./min on a sample of 10 mg and using the second heating cycle.

It has surprisingly been found that the use of a polymer having TcP which is 5-40° C. higher than TcPP (preferably polyoxymethylene and/or polyamide) in a polypropylene composition provides good optical properties, in particular a high clarity. It is surprising that such polymer (preferably polyoxymethylene and/or polyamide) has a similar effect to a polypropylene composition as a nucleating agent or a clarifying agent such as the ones disclosed in US2006270766. It is hence possible to partly or completely replace the nucleating agent or the clarifying agent by less expensive polymer (preferably polyoxymethylene and/or polyamide) according to the invention.

Preferably, compared to TmPP, TmP is higher, for example at least 1° C. higher, at last 5° C. higher or at least 10° C. higher, and/or for example at most 20° C. higher or at most 10° C. higher.

Compared to TcPP, TcP is at least 5° C. higher, for example at least 10° C. higher, at least 20° C. higher or at least 25° C. higher, and/or for example at most 40° C. higher or at most 30° C. higher.

Preferably, compared to TmPP, TmPOM is at least 1° C. higher, for example at least 5° C. higher or at least 10° C. higher, and/or for example at most 20° C. higher or at most 10° C. higher. Preferably, TmPOM is 1-20° C. higher than TmPP, for example 1-10° C. higher than TmPP, for example 5-10° C. higher than TmPP.

Preferably, compared to TcPP, TcPOM is at least 5° C. higher, for example at least 10° C., at least 20° C. higher or at least 25° C. higher, and/or for example at most 40° C. or at most 30° C. higher. Preferably, TcPOM is 5-40° C. higher than TcPP, for example 5-30° C. higher than TcPP, for example 20-30° C. higher than TcPP.

Preferably, compared to TmPP, TmPA is at least 1° C. higher, for example at least 5° C. higher or at least 10° C. higher, and/or for example at most 20° C. higher or at most 10° C. higher. Preferably, TmPA is 1-20° C. higher than TmPP, for example 5-20° C. higher than TmPP, for example 10-20° C. higher than TmPP.

Preferably, compared to TcPP, TcPA is at least 5° C. higher, for example at least 10° C. higher, at least 20° C. higher or at least 25° C. higher, and/or for example at most 40° C. higher or at most 30° C. higher. Preferably, TcPA is 5-40° C. higher than TcPP, for example 10-40° C. higher than TcPP, for example 25-40° C. higher than TcPP.

Preferably, TmPP is from about 140 to 180° C., for example from about 145 to about 175° C., for example from about 150 to about 170° C., for example from about 155 to about 165° C.

Preferably, TcPP is from about 100° C. to about 130° C., for example from about 110 to about 125° C., for example from about 115 to about 120° C.

Preferably, TmPOM is from about 155 to about 175° C., for example from about 160 to 170° C.

Preferably, TcPOM is from about 130 to about 155° C., for example from about 135 to about 150° C.

Preferably, TmPA is from about 175 to about 225° C., for example from about 180 to 200° C.

Preferably, TcPA is from about 135 to about 170° C., for example from about 140 to about 160° C.

Preferably, the melt mass flow rate (MFR) of the polypropylene as measured in accordance with ISO 1133 using a 2.16 kg weight and at a temperature of 230° C. is in the range from 10 to 40 g/10 min. Such polypropylene is suitable for use in injection molding. For injection molding, a relatively high MFR is required, unlike e.g. the production of a blown film.

Preferably, the MFR of the polyoxymethylene as measured in accordance with ISO 1133 using a 2.16 kg weight and at a temperature of 230° C. is in the range from 1 to 10 g/10 min, preferably from 2 to 8 g/10 min. This results in a better clarity. Particularly preferably, the MFR of the polyoxymethylene as measured in accordance with ISO 1133 using a 2.16 kg weight and at a temperature of 230° C. is 2 to 4 g/10 min. This results in a particularly good clarity.

Preferably, the MVR (melt volume-flow rate) of the polyoxymethylene as measured in accordance with ISO 1133 using a 2.16 kg weight and at a temperature of 190° C. is in the range from at least 1 cm$^3$/10 min, for example 2 cm$^3$/10 min, and/or at most 10 cm$^3$/10 min, for example at most 9 cm$^3$/10 min. Particularly preferably, the MVR of the polyoxymethylene as measured in accordance with ISO 1133 using a 2.16 kg weight and at a temperature of 190° C. is from 3 to 9 cm$^3$/10 min, for example from 5 to 9 cm$^3$/10 min. This results in a particularly good clarity.

Preferably, the MFR of the polyamide as measured in accordance with ISO 1133 using a 5 kg weight and at a temperature of 275° C. is in the range from 30 to 100 g/10 min.

It has been found that by using a polymer with TcP 5-40° C. higher than TcPP (preferably polyoxymethylene and/or polyamide), it is no longer necessary to incorporate nucleating agent into a polypropylene composition for a good clarity. Without wishing to be bound by theory, it may be that the polymer (preferably polyoxymethylene and/or polyamide) acts as a nucleating agent even without the presence of a further nucleating agent. The polymer having a higher crystallization temperature than polypropylene crystallizes first upon cooling of the melted composition, after which the polypropylene crystallizes around the crystallized polymer. Alternatively, the polyoxymethylene and/or polyamide improves the clarity of the polypropylene composition through a different mechanism. For example, the polyoxymethylene and/or polyamide may hinder crystallization (decrease crystallization rate) of the polypropylene matrix, unlike a nucleating agent, but still improves clarity.

In some embodiments, the composition may further comprise a nucleating or clarifying agent, for example in an amount of about 0.1 parts per million (ppm) or more, of about 1 ppm or more, about 5 ppm or more, or about 10 ppm or more, based on the weight of the nucleating and/or clarifying agent and the total weight of the polymer composition. In such embodiments, the nucleating and/or clarifying agent typically is present in the polymer composition in an amount of about 10,000 ppm or less, about 5,000 ppm or less, or about 2,000 ppm or less.

Preferably, the composition comprises little or no further nucleating or clarifying agent. For example, the composition comprises less than 1500 ppm (parts per million as weight based on the total composition), for example less than 1000 ppm, more preferably less than 1000 ppm, for example less than 500 ppm, for example less than 300 ppm, for example less than 100 ppm, for example less than 10 ppm, for example less than 1 ppm, for example less than 0.1 ppm, for example less than 0.05 ppm, for example less than 0.01 ppm of a nucleating or clarifying agent, preferably of nucleating or clarifying agents chosen from the group of benzoic acid salts, substituted benzoic acid salts, dicarboxylate metal salts, hexahydrophthalic acid metal salts, phosphate ester salts, glycerolate salts, diamides, triamides, tetramides, pine rosin derivatives, di-acetal derivatives, 2,6-nephthalene dicarboxamides, polyvinylcyclohexanes, talc, pigments and combinations thereof. more preferably the composition does not substantially comprise any nucleating or clarifying agent selected from the group of benzoic acid salts, substituted benzoic acid salts, dicarboxylate metal salts, hexahydrophthalic acid metal salts, phosphate ester salts, glycerolate salts, diamides, triamides, tetramides, pine rosin derivatives, di-acetal derivatives, 2,6-naphthalene dicarboxamides, polyvinylcyclohexanes and mixtures thereof.

Examples of benzoic acid salts suitable for use as the nucleating and/or clarifying agent include, but are not limited to sodium benzoate, lithium benzoate, aluminum para-tertiary butyl benzoate, and combinations thereof.

For purpose of the invention with nucleating agent or clarifying agent is meant any material that effectively accelerates the phase change from liquid polymer to semicrystalline polymer (evident via faster crystallization rates measured with a differential scanning calorimeter or small crystallites observed with an optical microscope).

Examples of nucleating agents are 2,6-naphthalene dicarboxamides, aliphatic mono- and di-carboxylate salts such as calcium pimelate and calcium suberate; and polyvinylcyclohexane.

Phosphate esters suitable for use as the nucleating and/or clarifying agent include, but are not limited to, sodium 2,2'-methylene-bis-(4,6-di-tert-butylphenyl)phosphate (from Asahi Denka Kogyo K. K., known as "NA-11 ™"), aluminum hydroxy bis[2,2'-methylene-bis-(4,6-di-tert-butylphenyl)phosphate] (from Asahi Denka Kogyo K.K., known as "NA-21 ™"), and other such phosphate esters as disclosed for example in U.S. Pat. Nos. 5,342,868 and 4,463,113.

Bicyclic dicarboxylate metal salts suitable for use as the nucleating and/or clarifying agent include, but are not limited to, those salts described in U.S. Pat. Nos. 6,465,551 and 6,534,574. The bicyclic salts having the structure shown below:

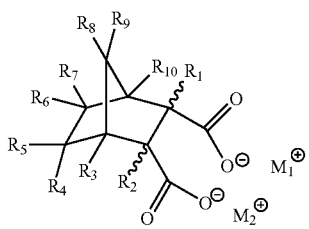

wherein $M_1$ and $M_2$ are independently selected from the group consisting of: sodium, calcium, strontium, lithium, zinc, magnesium, and monobasic aluminum; wherein $R_1$, $R_2$, $R_3$, $R_4$, $R_5$, $R_6$, $R_7$, $R_8$, $R_9$, and $R_{10}$ are independently selected from the group consisting of: hydrogen and $C_1$-$C_9$ alkyls; and further wherein any two adjacently positioned $R_3$-$R_{10}$ alkyl groups optionally may be combined to form a carbocyclic ring. In particular, suitable bicyclic dicarboxylate metal salts include disodium bicyclo[2.2.1]heptane-2,3-dicarboxylate, calcium bicyclo[2.2.1]heptane-2,3-dicarboxylate, and combinations thereof. One may employ HYPERFORM® HPN-68 or HPN-68L from Milliken & Company of Spartanburg, S.C. HPN-68L is commercially sold, and comprises the disodium bicyclo [2.2.1] heptane-2,3-dicarboxylate, as shown below:

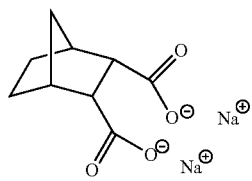 [SMILES: O=C([O-])C1C2CCC(C2)C1C(=O)[O-] ; [Na+] ; [Na+]]

Metal salts of hexahydrophthalic acid (HHPA) are known to the person skilled in the art. Such compounds may be as shown:

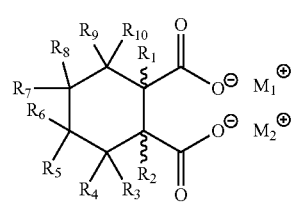

wherein $M_1$ and $M_2$ are the same or different, and may be combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogens, and phenyl. In one preferred embodiment, the $M_1$ and $M_2$ are combined as a calcium ion. Ca HHPA as referred to herein refers to the following compound:

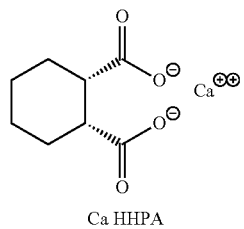 [SMILES: O=C([O-])[C@H]1CCCC[C@H]1C(=O)[O-] ; [Ca+2]]

Ca HHPA

Di-acetal derivatives, which may be used as nucleating and/or clarifying agent include, but are not limited to, alditol acetals, such as the sorbitol di-acetals described in U.S. Pat. No. 5,049,605. Suitable di-acetal derivatives preferably conform to the formula

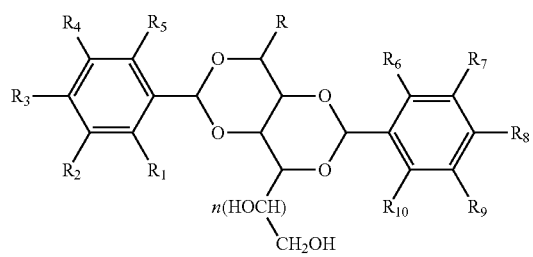

In formula (I), n typically is a value selected from 0, 1, or 2. R typically is selected from the group consisting of hydrogen, alkenyl (such as allyl), alkyl, alkoxy, hydroxylalkyl, alkyl-halide, aromatic and substituted aromatic groups. $R_1$, $R_2$, $R_3$, $R_4$, $R_5$, $R_6$, $R_7$, $R_8$, $R_9$, and $R_{10}$ typically are independently selected from the group consisting of hydrogen, fluorocarbons, alkenyl, alkyl, alkynyl, alkoxy, carboxy, halides, amino, thioether and aromatic groups. In certain embodiments, any two adjacent groups selected from $R_1$, $R_2$, $R_3$, $R_4$, $R_5$, $R_6$, $R_7$, $R_8$, $R_9$, and $R_{10}$ may be combined to form a cyclic group selected from the group consisting of methylenedioxy, cyclopentyl, cyclohexyl, or other similar cyclic groups. In certain embodiments, the nucleating or clarifying agent preferably is 1,3:2,4-bis(3,4-dimethylbenzylidene) sorbitol (hereinafter DMDBS), available from Miliiken Chemical under the trade name Millad® 3988.

Di-, tri-, and tetra-amides suitable for use as the nucleating and/or clarifying agent include, but are not limited to: di- and tri-amides containing amide cores comprised of either single and fused 4,5,6,7-membered aromatic or cycloaliphatic rings; di- and tri-amides containing amide cores comprised of di and tri aliphatic carboxylic acids or di and tri aliphatic amines; and tri- and tetra-amides containing amide cores comprised of aliphatic tri- and tetracarboxylic acids and aliphatic or cycloaliphatic amines. These compounds are exemplified in patent publications, including WO 2004072168, EP 0940431 and WO 200506387.

Polypropylene Matrix

With polypropylene as used herein is meant propylene homopolymer or a copolymer of propylene with an α-olefin, for example an α-olefin chosen from the group of α-olefin having 2 or 4 to 10 C-atoms, for example wherein the amount of α-olefin is less than 10 wt % based on the total propylene copolymer.

Polypropylene and a copolymer of propylene with an α-olefin can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

Preferably, the polypropylene used in the invention, is a propylene homopolymer.

Preferably, in the composition of the invention, the degree of crystallinity of the polypropylene is at least 35%, for example at least 40% and for example at most 80%, for example at most 75% as determined using Differential Scanning Calorimetry according to ASTM D 3418-08 using a scan rate of 10° C./min on a sample of 10 mg and using the second heating cycle.

For example, the degree of crystallinity of the polypropylene is in the range from 30 to 55%, for example in the range from 35 to 50% as determined using Differential Scanning Calorimetry according to ASTM D 3418-08 using a scan rate of 10° C./min on a sample of 10 mg and using the second heating cycle.

The degree of branching from the polypropylene is preferably low, for example the branching index g' is at least 0.95, preferably at least 0.96, for example at least 0.97, for example at least 0.98, for example at least 0.99, for example 1.00.

The branching index g' defines the degree or branching and correlates with the amount of branches of a polymer. The branching index g' is defined as $g'=[IV]_{br}/[IV]_{lin}$ in which g' is the branching index, $[IV]_{br}$ is the intrinsic viscosity of the branched polypropylene and $[IV]_{lin}$ is the intrinsic viscosity of the linear polypropylene having the same average molecular weight (within a range of ±3%) as the branched polypropylene. Thereby, a low g'-value is an indicator for a highly branched polymer. In other words, if the g'-value decreases, the branching of the polypropylene increases. Reference is made in this context to B. H. Zimm and W. H. Stockmeyer, J. Chem. Phys. 17, 1301 (1949). This document is hereby included by reference.

The intrinsic viscosity needed for determining the branching index g' is measured according to DIN ISO 1628/1, October 1999 (in decalin at 135° C.).

Alternatively, the branching of the polypropylene may be measured using $^{13}C$ NMR. Preferably the amount of branching in the polypropylene is low, for example the amount of branching in the polypropylene is in the range from 0 to 10 branches/1000 carbon atoms, for example in the range from 0 to 5 branches/1000 carbon atoms for example in the range from 1 to 5 branches/1000 carbon atoms. Preferably, the melt mass flow rate of the polypropylene as determined using ASTM D1238-10 (230° C./2.16 kg) ranges from 0.3-100 g/10 min. Preferably, the melt mass flow rate of the polypropylene ranges from 1 to 25 g/10 min, more preferably from 2 to 12 g/10 min.

Preferably, the amount of polypropylene in the composition of the invention is at least 80 wt %, for example at least 85 wt %, for example at least 90 wt %, for example at least 95 wt %, for example at least 97 wt %, for example at least 98 wt % based on the total composition.

POM

Polyoxymethylene (POM) is also known as polyacetal and may be one or more homopolymers, copolymers, or a mixture of these. The polyoxymethylene (or polyacetal) polymers described herein can be branched or linear and generally have a number average molecular weight of at least 10,000, preferably 20,000 to 90,000. The molecular weight may be measured: 1) by gel permeation chromatography in m-cresol at 160 degrees centigrade using a DuPont PSM bimodal column kit with nominal pore size of 60 and 1000 angstrom; or 2) by determining the melt flow using ASTM D1238 or ISO 1133.

Polyacetal homopolymers are prepared by polymerizing formaldehyde or formaldehyde equivalents, such as cyclic oligomers of formaldehyde. Preferred are homopolymers having terminal hydroxyl groups that are-capped by a chemical reaction to form ester or other groups. Preferred end groups for homopolymers are acetate and methoxy.

Polyacetal copolymers can contain one or more typical co-monomers, which include acetals and cyclic ethers that lead to the incorporation into the polymer chain of ether units with 2 to 12 sequential carbon atoms. When these compositions include such a copolymer, the quantity of co-monomer will not be more than 20 weight percent, preferably not more than 15 weight percent, and most preferably about two weight percent. Preferable co-monomers include ethylene oxide, butylene oxide and, more preferably 1,3-dioxolane.

In general, preferable polyoxymethylene copolymers are those for which the quantity of co-monomer is about 2 weight percent and are not completely end-capped, but have some free hydroxy ends from the co-monomer unit or are terminated with ether groups. Preferred end groups for copolymers are hydroxy and methoxy.

Polyamide

The polyamide may be homopolymer, copolymer, terpolymer or higher order polymer. Blends of two or more polyamides may be used. Suitable polyamides can be condensation products of dicarboxylic acids or their derivatives and diamines, and/or aminocarboxylic acids, and/or ring-opening polymerization products of lactams.

Suitable dicarboxylic acids include, adipic acid, azelaic acid, sebacic acid, dodecanedioic acid, isophthalic acid and terephthalic acid. Suitable diamines include tetramethylenediamine, hexamethylenediamine, octamethylenediamine, nonamethylenediamine, dodecamethylenediamine, 2-methylpentamethylenediamine, 2-methyloctamethylenediamine, trimethylhexamethylenediamine, bis(p-aminocyclohexyl)methane, m-xylylenediamine, and p-xylylenediamine. A suitable aminocarboxylic acid is 11-aminododecanoic acid. Suitable lactams include caprolactam and laurolactam.

Preferred aliphatic polyamides include polyamide 6; polyamide 66; polyamide 46; polyamide 69; polyamide 610; polyamide 612; polyamide 1010; polyamide 11; polyamide 12; semi-aromatic polyamides such as poly(m-xylylene adipamide) (polyamide MXD6), poly(dodecamethylene terephthalamide) (polyamide 12T), poly(decamethylene terephthalamide) (polyamide 10T), poly(nonamethylene terephthalamide) (polyamide 9T), the polyamide of hexamethylene terephthalamide and hexamethylene adipamide (polyamide 6T/66); the polyamide of hexamethyleneterephthalamide and 2-methylpentamethyleneterephthalamide (polyamide 6T/DT); the polyamide of hexamethylene isophthalamide and hexamethylene adipamide (polyamide 6I/66); the polyamide of hexamethylene terephthalamide, hexamethylene isophthalamide, and hexamethylene adipamide (polyamide 6T/6I/66) and copolymers and mixtures of these polymers. Examples of suitable aliphatic polyamides include polyamide 66/6 copolymer; polyamide 66/68 copolymer; polyamide 66/610 copolymer; polyamide 66/612 copolymer; polyamide 66/10 copolymer; polyamide 66/12 copolymer; polyamide 6/68 copolymer; polyamide 6/610 copolymer; polyamide 6/612 copolymer; polyamide 6/10 copolymer; polyamide 6/12 copolymer; polyamide 6/66/610 terpolymer; polyamide 6/66/69 terpolymer; polyamide 6/66/11 terpolymer; polyamide 6/66/12 terpolymer; polyamide 6/610/11 terpolymer; polyamide 6/610/12 terpolymer; and polyamide 6/66/PACM (bis-p-{aminocyclohexyl} methane) terpolymer.

Preferred examples of the polyamide include polyamide 6 and polyamide 66.

The polyamide may be a glass fiber reinforced polyamide. The glass fibers may be any glass fibers available for the reinforcement of plastic materials. The amount of the glass fiber may e.g. be 1-50 wt %, 5-45 wt %, 10-40 wt % or 30-35 wt % of the total of the glass fiber and the polyamide. The glass fibers include, but are not limited to, chopped strand E-glass fibers.

Non-glass fiber reinforced polyamides and glass fiber reinforced polyamides are commercially available e.g. from DuPont under the brand name Zytel®.

Amount of POM and Polyamide

In the composition of the invention, in some embodiments, the total amount of POM and polyamide is from 0.005 to 10 wt % based on the total weight of the polypropylene, the POM and the polyamide in the composition.

In the composition of the invention, in some embodiments, the amount of the polymer preferably chosen from the group consisting of polyoxymethylene, polyamide and mixture thereof is from 0.005 to 5 wt % based on the total weight of components (a) and (b).

The composition of the invention may comprise either one or both of POM and polyamide.

In the cases where the composition of the invention comprises POM but not polyamide, the amount of POM in the composition is preferably at least 0.01, for example at least 0.02, for example at least 0.03, for example at least 0.04, for example at least 0.05, for example at least 0.1, for example at least 0.2, for example at least 0.3, for example at least 0.4, for example at least 0.5, for example at least 0.7, for example at least 1, for example at least 2 and/or for example at most 8, for example at most 6, for example at most 5, for example at most 3, for example at most 1.5, for example at most 1 wt % based on the total weight of components a) and b) in the composition. Preferably, the amount of POM in the composition is from about 0.01 to about 5 wt % based on the total weight of components a) and b) in the composition. The composition comprising no polyamide is herein understood to mean that the composition comprises less than 1500 ppm (parts per million as weight based on components a) and b) of the composition) of polyamide, for example less than 1000 ppm, more preferably less than 1000 ppm, for example less than 500 ppm, for example less than 300 ppm, for example less than 100 ppm, for example less than 10 ppm, for example less than 1 ppm, for example less than 0.1 ppm, for example less than 0.05 ppm, for example less than 0.01 ppm based on components a) and b) of the composition.

In the cases where the composition of the invention comprises polyamide but not POM, the amount of polyamide in the composition is preferably at least 0.01, for example at least 0.02, for example at least 0.03, for example at least 0.04, for example at least 0.05, for example at least 0.1, for example at least 0.2, for example at least 0.3, for example at least 0.4, for example at least 0.5, for example at least 0.7, for example at least 1, for example at least 2 and/or for example at most 8, for example at most 6, for example at most 5, for example at most 3, for example at most 1.5, for example at most 1 wt % based on the total weight of the polypropylene and the polyamide in the composition. Preferably, the amount of polyamide in the composition is from about 0.01 to about 5 wt % based on the total weight of components a) and b) in the composition. The composition comprising no POM is herein understood to mean that the composition comprises less than 1500 ppm (parts per million as weight based on components a) and b) of the composition) of POM, for example less than 1000 ppm, more preferably less than 1000 ppm, for example less than 500 ppm, for example less than 300 ppm, for example less than 100 ppm, for example less than 10 ppm, for example less than 1 ppm, for example less than 0.1 ppm, for example less than 0.05 ppm, for example less than 0.01 ppm based on components a) and b) of the composition.

In the cases where the composition of the invention comprises POM and polyamide, the amount of the total of POM and polyamide in the composition is preferably at least 0.01, for example at least 0.02, for example at least 0.03, for example at least 0.04, for example at least 0.05, for example at least 0.1, for example at least 0.2, for example at least 0.3, for example at least 0.4, for example at least 0.5, for example at least 0.7, for example at least 1, for example at least 2 and/or for example at most 8, for example at most 6, for example at most 5, for example at most 3, for example at most 1.5, for example at most 1 wt % based on the total weight of components a) and b) in the composition. Preferably, the amount of the total of POM and polyamide in the composition is from about 0.01 to about 5 wt % based on the total weight of components a) and b) in the composition. The weight ratio between POM to polyamide may be chosen at any value. The weight ratio between POM to polyamide may e.g. be at least 1:1000, at least 1:100, at least 1:50, at least 1:20, at least 1:10, at least 1:5, at least 1:3, at least 1:2; at least 1:1, at least 2:1, at least 3:1, at least 5:1, at least 10:1, at least 20:1, at least 50:1, at least 100:1 or at least 1000:1. The weight ratio between POM to polyamide may e.g. be at most 1:1000, at most 1:100, at most 1:50, at most 1:20, at most 1:10, at most 1:5, at most 1:3, at most 1:2; at most 1:1, at most 2:1, at most 3:1, at most 5:1, at most 10:1, at most 20:1, at most 50:1, at most 100:1 or at most 1000:1.

Additives

Optionally, additives may be present in the composition of the present invention. The additives may for example be added prior to or during the melt-mixing of the POM and/or PA with the PP. Examples of suitable additives include but are not limited to the additives usually used for PP, for example antioxidants, acid scavengers, processing aids, lubricants, surfactants, blowing agents, ultraviolet light absorbers, quenchers, antistatic agents, slip agents, antiblocking agents, antifogging agents, pigments, dyes and fillers, and cure agents such as peroxides. The additives may be present in the typically effective amounts well known in the art, such as 0.001 weight % to 10 weight based on the total composition.

Therefore, the invention also relates to a composition of the invention further comprising additives.

The composition of the invention may be prepared by melt-mixing the POM and/or PA with the polypropylene (PP).

Therefore, in another aspect, the invention also relates to a process for the preparation of the composition of the invention comprising the step of
melt-mixing the POM and/or the PA with the polypropylene and the optional additives.

Before melt-mixing, the POM and/or the PA and the polypropylene and the optional additives may be pre-mixed in a mixer, for example a dry blender (as may be purchased from Henschell). The the POM and/or the PA and the polypropylene are preferably pre-mixed or melt-mixed in the form of a powder or granules but, although less preferred may also be melt-mixed in the form of pellets.

After the melt-mixing, the composition obtained in the melt-mixing may be pelletized.

With melt-mixing is meant that the POM and/or the PA and the polypropylene are mixed at a temperature that exceeds the Tm or Tc of the POM and/or the PA and the polypropylene. Melt-mixing may be done using techniques known to the skilled person, for example in an extruder, for example a single screw or twin screw extruder, preferably a twin screw extruder.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 150° C. in the feed zone to 300° C. at the die. Preferably, the temperature in the extruder varies from 165 to 250° C.; likewise, the screw speed of the extruder may be varied as needed. Typical screw speeds are in the range from about 100 rpm to about 400 rpm.

It has been found that the optical properties and in particular the clarity of the composition of the invention is improved as compared to a polypropylene composition not containing the polymer having Tc which is 5-40° C. higher than Pc such as POM and/or PA. For purpose of the invention, the clarity of the composition is measured according to ASTM D1746-09. Preferably, the clarity of the composition as measured according to ASTM D1746-09 is at least 10, for example at least 20, for example at least 30, for example at least 50, for example at least 60, for example at least 70, for example at least 80%, for example at least 90%.

One application of thin wall injection molding is thin wall packaging. Thin wall packaging produced via thin wall injection molding provides an answer to the desire for a more sustainable way of packaging, since less material and energy are needed for the injection molding. Consequently, thin wall packaging produced via thin wall injection molding reduces the carbon footprint of the packaging.

In another aspect, therefore, the invention relates to the use of the composition of the invention in injection molding, in particular to thin wall injection molding.

The most optimal conditions for (thin wall) injection molding depend on the exact composition used. In general, the temperature for injection molding will be around the $T_m$ or $T_c$ of the component (b) in the composition of the invention, for example in the range from about 150 to about 200° C., for example in the range from about 150 to about 170° C., for example from about 155 to about 165° C. The optimal filling speed (generally less than 0.5 seconds for thin wall injection molding) and pressure with which the composition is injected into the mold, the time needed for cooling etc. can easily be determined by the person skilled in the art. For short cycle times, it is desired to keep the time that the composition is in the mold as short as possible.

The definition of thin wall is dynamic, since it depends upon the application for which it is used. Within the framework of this invention with 'thin wall' is meant a wall thickness in the range from 0.5 to 3.5, preferably 0.5 to 2 mm.

Examples of thin wall packaging items include but are not limited to: food packaging items, such as tubs, trays, jars, containers, lids, plates and cups Since the compositions of the invention may have a high heat distortion temperature as well as a low brittleness around freezing temperature, articles produced from said composition can be used at high as well as at lower temperatures.

Application areas where use at both higher and lower temperatures are desired are for example food applications, for example microwaveable, freezer-safe and ovenable containers and medical applications, where sterilization is needed prior to the filling of a container, but the medication inside the container needs to be stored at a low temperature (e.g. from 4 to 7° C.).

In another aspect, the invention relates to articles comprising the composition of the invention, wherein the article is prepared by injection molding, preferably thin wall injection molding.

In yet another aspect, the invention relates to a process comprising the step of injecting the composition of the invention in a mold, preferably a thin wall mold, wherein a thin wall mold is a mold providing a space having a wall thickness in the range from 0.5 to 2 mm.

Examples of thin wall injection molded objects include but are not limited to (food) packaging, cellular phone components, laptop/notebook computer components, hand held devices and medical devices, document cases, storage containers, pen barrels and packaging for textiles, for example for dry goods, socks, handkerchiefs, underwear etc.

The invention further relates to use of polyoxymethylene and/or polyamide for increasing clarity of a composition comprising polypropylene having a melt mass flow rate as measured in accordance with ISO 1133 using a 2.16 kg weight and at a temperature of 230° C. in the range from 0.1 to 100 g/10 min, wherein the clarity is measured according to ASTM D1746,
wherein the polypropylene has a melt temperature TmPP and a crystallization temperature TcPP,
the polyoxymethylene has a melt temperature TmPOM and a crystallization temperature TcPOM,
the polyamide has a melt temperature TmPA and a crystallization temperature TcPA,
wherein TmPOM is higher than TmPP, TmPA is higher than TmPP, TcPOM is higher than TcPP and TcPA is higher than TcPP,
wherein the $T_m$ and $T_c$ are determined using Differential Scanning Calorimetry according to ASTM D 3418-08 using a scan rate of 10° C./min on a sample of 10 mg and using the second heating cycle.

The invention further relates to use of a polymer preferably chosen from the group consisting of polyoxymethylene, polyamide and mixture thereof for increasing clarity of a composition comprising polypropylene having a melt mass flow rate as measured in accordance with ISO 1133 using a 2.16 kg weight and at a temperature of 230° C. in the range from 10 to 40 g/10 min, wherein the clarity is measured according to ASTM D1746,
wherein the polypropylene has a melt temperature TmPP and a crystallization temperature TcPP,
wherein the polymer has a melt temperature TmP and a crystallization temperature TcP,
wherein the TcP is 5-40° C. higher than TcPP,
wherein the $T_m$ and $T_c$ are determined using Differential Scanning Calorimetry according to ASTM D 3418-08 using a scan rate of 10° C./min on a sample of 10 mg and using the second heating cycle.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXPERIMENTS

Polypropylene, polyoxymethylene and polyamide were cryogenically grinded in powder form. Polypropylene was added in a 10.0 kg Henschel mixer (dry blender) with the amounts of polyoxymethylene or polyamide indicated in Table 1, together with the additives (primary antioxidant Irganox1076 and zinc stearate as acid scavenger) and mixed. The subsequent melt mixing was done in a Krauss Maffei Berstoff TSE.

The compositions are shown in Table 1. The amounts of POM and PA were varied from 0 to 1.0 wt %. The clarity was measured according to ASTM D1746-09.

TABLE 1

Compositions used in the examples

| Composition name | additional POM or PA | amount (wt % with respect to total) | Clarity (%) | % improvement |
|---|---|---|---|---|
| Comparative A | none | 0 | 28.36 | — |
| Example 1 | POM | 0.1 | 33.8 | 16 |
| Example 2 | POM | 0.5 | 35.54 | 20 |
| Example 3 | POM | 1.0 | 33 | 14 |
| Example 4 | PA | 0.1 | 32.80 | 13.5 |
| Example 5 | PA | 0.5 | 33.06 | 14 |
| Example 6 | PA | 1.0 | 33.36 | 15 |

Following ingredients were used in the compositions of Table 1.
Polypropylene: Polypropylene having a melt index of 25 g/10 min (measured in accordance with ISO 1133 using a 2.16 kg weight and at a temperature of 230° C.) and a density of 0.924 g/cm3. Tm: 160.8° C. and Tc: 119.4° C.
POM: Hostaform C9021 from Ticona (Celanese). Tm: 168.5° C. and Tc: 146° C.
PA: PA6 with 33% Glass fiber from Dupont. Tm: 178° C. and Tc: 150° C.

$T_m$ and $T_c$ of PP, POM and PA were determined using Differential Scanning Calorimetry according to ASTM D 3418-08 using a scan rate of 10° C./min on a sample of 10 mg and using the second heating cycle.

For the compositions comprising POM, 14-20% improvement in clarity was observed. For the compositions comprising PA, 13.5-15% improvement in clarity was observed.

The composition of comparative experiment A was injection molded in the Battenfeld Injection molding machine using 2 mm thick plaque mold according the following operating conditions. A composition of example 2 in which the POM (Hostaform C9021) was replaced by the same amount of POM (Hostaform C2521) was injection molded in the same conditions. The measured properties of the plaques are shown in Table 2.

TABLE 2

| | Set |
|---|---|
| Clamp force - KN | 800 |
| PInjection PSI | 800 |
| PHold PSI | 600 |
| tCool (sec) | 20 |
| tHold (sec) | 12 |
| tEject (sec) | 1 |
| Total cycle time (sec) | 34-45 |
| Injection speed mm/s | 10 |
| V-flow rate (cm³/sec) | |
| T-Z-1 ° C. | 150 |
| T-Z-2 ° C. | 160 |
| T-Z-3 ° C. | 160 |
| TNozzle - ° C. | 165 |
| TMelt - ° C. | 165-180 |
| TMold - ° C. | 50 |
| Mold type - 2 mm | Rect |
| PBack - Bar | 100 |
| Screw speed - mm/s | 80 |
| Metering - (mm) | 35 |
| Cushion - mm | 2 |
| Inj. time - sec | 3.4 |

| | Comp A | PP with 0.5 wt % of POM | % Improvement |
|---|---|---|---|
| Clarity | 24.28 | 91.34 | 73 |
| Haze | 95.62 | 90.18 | |
| Gloss45 | 49.84 | 54.48 | |

The clarity was measured according to ASTM D1746-09.
The gloss was measured according to ASTM D2457-08e1 at a 45° angle.
The haze was measured according to ASTM D1003-11e1.

The invention claimed is:

1. A composition comprising
(a) polypropylene having a melt mass flow rate as measured in accordance with ISO 1133 using a 2.16 kg weight and at a temperature of 230° C. in the range from 10 to 40 g/10 min and
(b) a polymer comprising polyoxymethylene,
wherein
the polypropylene (a) has a melt temperature TmPP and a crystallization temperature TcPP, the polymer (b) has a melt temperature TmP and a crystallization temperature TcP, wherein the TcP is 5-40° C. higher than TcPP, wherein the $T_m$ and $T_c$ are determined using Differential Scanning calorimetry according to ASTM D 3418-08 using a scan rate of 10° C./min on a sample of 10 mg and using the second heating cycle, wherein the composition comprises polyoxymethylene (POM) but not polyamide and the amount of POM in the composition is at least 0.3 wt % and at most 1 wt % based on the total weight of components a) and b) in the composition, and wherein the clarity of the composition as measured according to ASTM D1746 is at least 30%.

2. The composition according to claim 1, wherein the polyoxymethylene has a melt temperature TmPOM and a crystallization temperature TcPOM and TmPOM is 1-20° C. higher than TmPP and TcPOM is 5-40° C. higher than TcPP.

3. The composition according to claim 1, wherein the composition comprises less than 1500 ppm of nucleating or clarifying agents selected from the group of benzoic acid salts, substituted benzoic acid salts, dicarboxylate metal salts, hexahydrophthalic acid metal salts, phosphate ester salts, glycerolate salts, diamides, triamides, tetramides, pine rosin derivatives, di-acetal derivatives, 2,6-naphthalene dicarboxamides, polyvinylcyclohexanes, talc, pigments and combinations thereof.

4. An article comprising the composition of claim 1, wherein the article is prepared by injection molding.

5. A process comprising the step of injecting the composition of claim 1 into a mold.

6. A process comprising the step of injecting the composition of claim 1 into a thin wall mold, wherein a thin wall mold is a mold providing a space having a wall thickness in the range from 0.5 to 2 mm.

7. A process for the preparation of the composition of claim 1 comprising the step of melt-mixing the polyoxymethylene with the polypropylene and optional additives.

8. A process for increasing clarity of a composition comprising:

using a polymer comprising polyoxymethylene, wherein the composition comprises polypropylene having a melt mass flow rate as measured in accordance with ISO 1133 using a 2.16 kg weight and at a temperature of 230° C. in the range from 10 to 40 g/10 min, wherein the clarity is measured according to ASTM D1746, wherein the polypropylene has a melt temperature TmPP and a crystallization temperature TcPP, the polymer has a melt temperature TmP and a crystallization temperature TcP, wherein the TcP is 5-40° C. higher than TcPP, wherein the $T_m$ and $T_c$ are determined using Differential Scanning calorimetry according to ASTM D 3418-08 using a scan rate of 10° C./min on a sample of 10 mg and using the second heating cycle, wherein the composition comprises polyoxymethylene (POM) but not polyamide, the amount of POM in the composition is at least 0.3 wt % and at most 1 wt % based on the total weight of components a) and b) in the composition, and wherein the clarity of the composition is at least 30%.

9. The article of claim 4, wherein the article is formed by thin wall injection molding.

10. The composition according to claim 1, wherein the amount of POM in the composition is at least 0.4 wt % and at most 1 wt % based on the total weight of components a) and b) in the composition.

11. The composition according to claim 1, wherein the amount of POM in the composition is at least 0.5 wt % and at most 1 wt % based on the total weight of components a) and b) in the composition.

12. The composition according to claim 1, wherein the amount of POM in the composition is at least 0.7 wt % and at most 1 wt % based on the total weight of components a) and b) in the composition.

13. The composition according to claim 1, wherein the clarity of the composition as measured according to ASTM D1746 is at least 50%.

14. The composition according to claim 1, wherein the clarity of the composition as measured according to ASTM D1746 is at least 60%.

15. The composition according to claim 1, wherein the clarity of the composition as measured according to ASTM D1746 is at least 70%.

16. The composition according to claim 1, wherein the clarity of the composition as measured according to ASTM D1746 is at least 80%.

17. The composition according to claim 1, wherein the clarity of the composition as measured according to ASTM D1746 is at least 90%.

* * * * *